(12) United States Patent
Karaoguz et al.

(10) Patent No.: US 8,355,693 B2
(45) Date of Patent: Jan. 15, 2013

(54) DETERMINING APPLICATION USAGE RELATIVE TO A PARTICULAR LOCATION

(75) Inventors: Jeyhan Karaoguz, Irvine, CA (US); Charles Abraham, Los Gatos, CA (US); Mark Buer, Gilbert, AZ (US); David Garrett, Tustin, CA (US); David Albert Lundgren, Mill Valley, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 119 days.

(21) Appl. No.: 12/732,997

(22) Filed: Mar. 26, 2010

(65) Prior Publication Data

US 2011/0201358 A1    Aug. 18, 2011

Related U.S. Application Data

(60) Provisional application No. 61/303,931, filed on Feb. 12, 2010.

(51) Int. Cl.
*H04M 11/00* (2006.01)
*H04W 24/00* (2009.01)

(52) U.S. Cl. ............... 455/405; 455/456.3; 340/286.01; 340/815.4; 709/201; 715/706

(58) Field of Classification Search ............... 455/456.3, 455/405; 340/815.4, 286.01; 709/201; 715/706, 715/45

See application file for complete search history.

(56) References Cited

U.S. PATENT DOCUMENTS

| | | | | |
|---|---|---|---|---|
| 5,703,564 | A * | 12/1997 | Begum et al. | 340/815.4 |
| 6,047,310 | A * | 4/2000 | Kamakura et al. | 709/201 |
| 7,213,206 | B2 * | 5/2007 | Fogg | 715/706 |
| 7,262,687 | B2 * | 8/2007 | Nelson | 340/286.01 |
| 7,574,661 | B2 * | 8/2009 | Matsuura et al. | 715/745 |
| 7,817,983 | B2 * | 10/2010 | Cassett et al. | 455/405 |
| 7,953,654 | B2 * | 5/2011 | Abifaker | 705/35 |
| 2003/0225893 | A1 | 12/2003 | Roese | |
| 2003/0233278 | A1 * | 12/2003 | Marshall | 705/14 |
| 2007/0286135 | A1 * | 12/2007 | Kirke | 370/338 |
| 2008/0195633 | A1 * | 8/2008 | Rose et al. | 707/100 |
| 2009/0144786 | A1 * | 6/2009 | Branam et al. | 725/109 |
| 2009/0192928 | A1 * | 7/2009 | Abifaker | 705/35 |
| 2010/0241501 | A1 * | 9/2010 | Marshall | 705/14.13 |
| 2011/0137918 | A1 * | 6/2011 | Yasrebi et al. | 707/748 |
| 2011/0145222 | A1 * | 6/2011 | Owen | 707/722 |
| 2011/0201358 | A1 * | 8/2011 | Karaoguz et al. | 455/456.3 |
| 2011/0288978 | A1 * | 11/2011 | Abifaker | 705/35 |

* cited by examiner

*Primary Examiner* — William D Cumming
(74) *Attorney, Agent, or Firm* — Sterne, Kessler, Goldstein & Fox, P.L.L.C.

(57) ABSTRACT

A mobile device collects information about application usage and associates collected application information with a location of the mobile device and/or a time that the application is accessed. The application is stored on the mobile device or on an external device and accessed via a network. The application information, location of the mobile device and time the application is accessed are communicated to another device and stored in a storage device which may be operated or managed by a service provider or another entity. The application information may comprise identification of a website, a network device or URL, the application and/or data that is input and/or output from the application. The location of the mobile device and/or the time, are determined utilizing a GNSS receiver and/or utilizing information from a network device. The application information, the location of the mobile device and/or the time may be utilized for targeted advertizing.

20 Claims, 4 Drawing Sheets

DETERMINING APPLICATION USAGE RELATIVE TO A PARTICULAR LOCATION

CROSS-REFERENCE TO RELATED APPLICATIONS/INCORPORATION BY REFERENCE

This application makes reference to, claims priority to, and claims the benefit of U.S. Provisional Application Ser. No. 61/303,931, filed on Feb. 12, 2010, which is incorporated herein by reference in its entirety.

This application makes reference to:
U.S. Provisional Patent Application Ser. No. 61/304,947 which was filed on Feb. 16, 2010;
U.S. patent application Ser. No. 12/732,849 which was filed on Mar. 26, 2010;
U.S. Provisional Patent Application Ser. No. 61/304,100 which was filed on Feb. 12, 2010;
U.S. patent application Ser. No. 12/748,142 which was filed on Mar. 26, 2010;
U.S. Provisional Patent Application Ser. No. 61/304,114 which was filed on Feb. 12, 2010;
U.S. patent application Ser. No. 12/729,184 which was filed on Mar. 22, 2010;
U.S. Provisional Patent Application Ser. No. 61/304,168 which was filed on Feb. 12, 2010;
U.S. patent application Ser. No. 12/732,913 which was filed on Mar. 26, 2010;
U.S. Provisional Patent Application Ser. No. 61/304,128 which was filed on Feb. 12, 2010;
U.S. patent application Ser. No. 12/748,159 which was filed on Mar. 26, 2010;
U.S. Provisional Patent Application Ser. No. 61/311,879 which was filed on Mar. 9, 2010;
U.S. patent application Ser. No. 12/732,922 which was filed on Mar. 26, 2010;
U.S. Provisional Patent Application Ser. No. 61/304,193 which was filed on Feb. 12, 2010;
U.S. patent application Ser. No. 12/729,197 which was filed on Mar. 22, 2010;
U.S. Provisional Patent Application Ser. No. 61/304,205 which was filed on Feb. 12, 2010;
U.S. patent application Ser. No. 12/748,177 which was filed on Mar. 26, 2010;
U.S. Provisional Patent Application Ser. No. 61/312,979 which was filed on Mar. 11, 2010;
U.S. patent application Ser. No. 12/748,106 which was filed on Mar. 26, 2010;
U.S. Provisional Patent Application Ser. No. 61/312,994 which was filed on Mar. 11, 2010;
U.S. patent application Ser. No. 12/748,175 which was filed on Mar. 26, 2010;
U.S. Provisional Patent Application Ser. No. 61/303,794 which was filed on Feb. 12, 2010;
U.S. patent application Ser. No. 12/748,197 which was filed on Mar. 26, 2010;
U.S. Provisional Patent Application Ser. No. 61/312,970 which was filed on Mar. 11, 2010;
U.S. patent application Ser. No. 12/732,973 which was filed on Mar. 26, 2010;
U.S. Provisional Patent Application Ser. No. 61/304,198 which was filed on Feb. 12, 2010;
U.S. patent application Ser. No. 12/732,940 which was filed on Mar. 26, 2010;
U.S. Provisional Patent Application Ser. No. 61/304,210 which was filed on Feb. 12, 2010;
U.S. patent application Ser. No. 12/748,194 which was filed on Mar. 26, 2010;
U.S. Provisional Patent Application Ser. No. 61/306,387 which was filed on Feb. 19, 2010;
U.S. patent application Ser. No. 12/748,212 which was filed on Mar. 26, 2010;
U.S. Provisional Patent Application Ser. No. 61/303,975 which was filed on Feb. 12, 2010;
U.S. patent application Ser. No. 12/748,039 which was filed on Mar. 26, 2010;
U.S. Provisional Patent Application Ser. No. 61/305,174 which was filed on Feb. 17, 2010;
U.S. patent application Ser. No. 12/732,986 which was filed on Mar. 26, 2010;
U.S. Provisional Patent Application Ser. No. 61/314,521 which was filed on Mar. 16, 2010;
U.S. patent application Ser. No. 12/748,016 which was filed on Mar. 26, 2010;
U.S. Provisional Patent Application Ser. No. 61/304,240 which was filed on Feb. 12, 2010;
U.S. patent application Ser. No. 12/722,408 which was filed on Mar. 11, 2010;
U.S. Provisional Patent Application Ser. No. 61/304,253 which was filed on Feb. 12, 2010;
U.S. patent application Ser. No. 12/748,240 which was filed on Mar. 26, 2010;
U.S. Provisional Patent Application Ser. No. 61/309,260 which was filed on Mar. 1, 2010;
U.S. patent application Ser. No. 12/748,104 which was filed on Mar. 26, 2010;
U.S. Provisional Patent Application Ser. No. 61/306,639 which was filed on Feb. 22, 2010; and
U.S. patent application Ser. No. 12/748,010 which was filed on Mar. 26, 2010.

Each of the above stated applications is hereby incorporated herein by reference in its entirety.

FIELD OF THE INVENTION

Certain embodiments of the invention relate to communication systems. More specifically, certain embodiments of the invention relate to determining application usage relative to a particular location.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, Time of Arrival (TOA), Observed Time Difference of Arrival (OTDOA), Enhanced Observed Time Difference (E-OTD) as well as the Global navigation satellite-based systems (GNSS) such as Global Positioning System (GPS), Global Navigation Satellite System (GLONASS), Galileo, and/or Assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for determining application usage relative to a particular location.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for determining application usage relative to a particular location. One or more processors and/or circuits in a mobile device may be operable to collect information about an application, information about accessing of the application and/or information about interaction with the application by the mobile device. The information about the application, about accessing of the application and/or about interaction with the application by the mobile device may be referred to as the application information. The collected information may comprise one or more of a URL that is utilized to access a device and/or a website, information about any local or remote application that executes subsequent to, and/or as a result of, utilizing the URL, and content retrieved from the accessed device. The application may be stored and/or executed on the mobile device or may be stored and/or executed on a device that is external to the mobile device. In this regard, the application may be accessed via one or more of a data network, a voice network and/or a mobile device network, for example.

A location of the mobile device and/or a time may be associated with the collected application information. The location of the mobile device and/or the time may be determined utilizing a GNSS receiver within the mobile device and/or may be determined utilizing information from a network device, for example. The collected application information, the associated location of the mobile device and/or the associated time may be communicated to an external device.

The collected application information may comprise one or more of identification of a website, identification of a network device, identification of the application and data that is input and/or output from the application. The collected application information, the location of the mobile phone and/or the time may be stored by an external device in a storage device, for example, in a database and may be utilized to determine targeted advertising. The external device may be operated and/or managed by a service provider for the mobile device and/or may be operated and/or managed by another entity.

Figure 1:
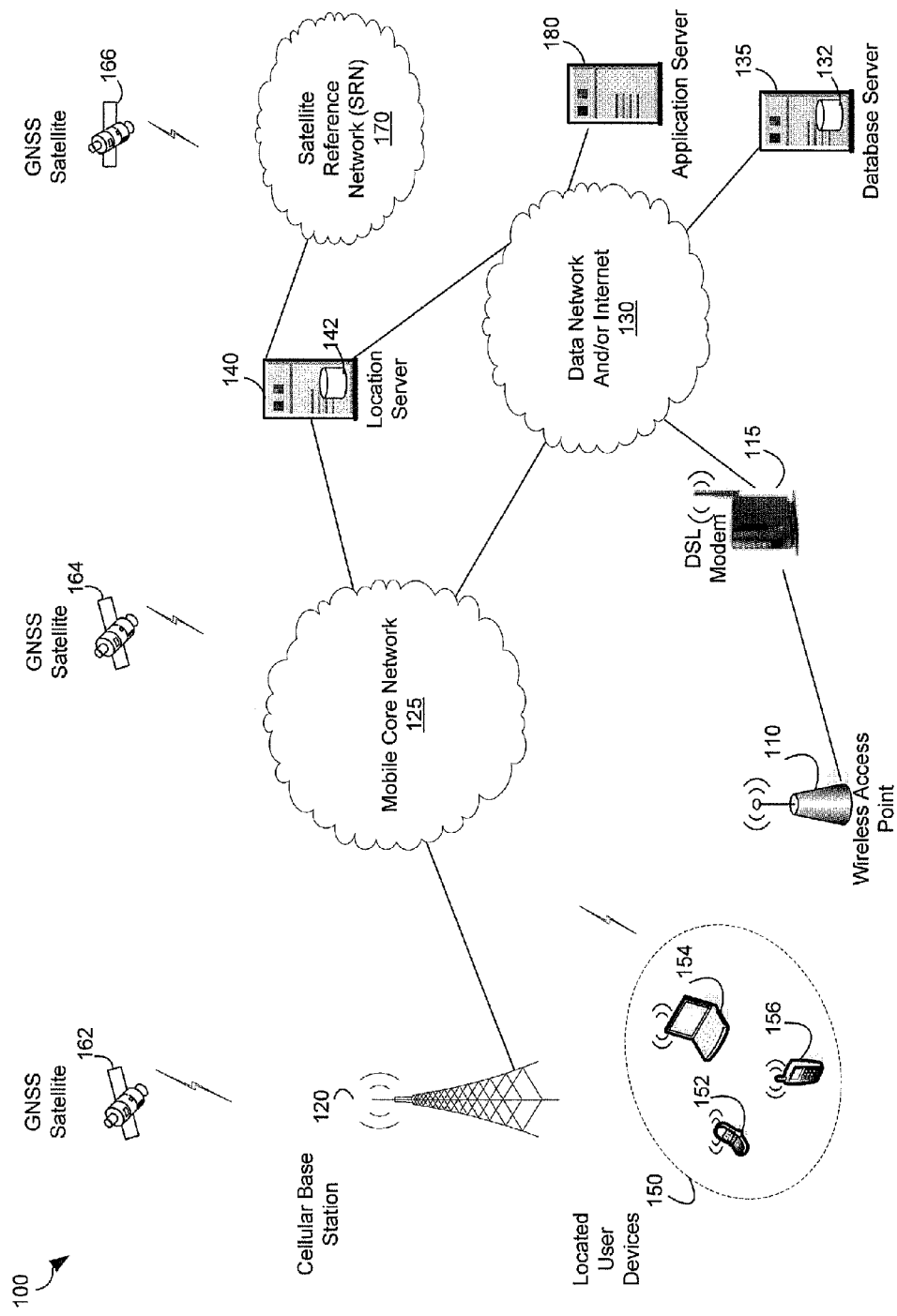
FIG. 1 is a diagram illustrating an exemplary communication system that is operable to collect and utilize information regarding applications and/or services accessed by a device and corresponding access time and/or location of the device, in accordance with an embodiment of the invention.

FIG. 1 is a diagram illustrating an exemplary communication system that is operable to collect and utilize information regarding applications and/or services accessed by a device and corresponding access time and/or location of the device, in accordance with an embodiment of the invention. Referring to FIG. 1, there is shown a communication system 100. The communication system 100 comprises a plurality of communication devices 150, of which mobile devices 152, 154 and 156 are illustrated, a cellular base station 120, a mobile core network 125, a location server 140 comprising a database 142, a satellite reference network (SRN) 170, a plurality of GNSS satellites, of which GNSS satellites 162, 164 and 166 are illustrated. In addition, there is shown a wireless access point 110, a digital subscriber line (DSL) modem 115, the data network 130, an application server 180 and a database server 135 comprising a database 132.

The plurality of communication devices 150 may comprise suitable logic, circuitry, interfaces and/or code that may be operable to communicate based on one or more of a variety of wireless and/or wired communication protocols. For example, the plurality of communication devices 150 may be operable to communicate with one or more of a satellite network, for example, a GNSS network, a wide area network, for example, a cellular network, a local area network, for example, a WiFi network or WLAN and/or a personal area network, for example, via a Bluetooth connection. Exemplary communication devices 150 may comprise a mobile phone, a laptop, a media player, a gaming device, a medical device and/or a location determination device although the invention is not limited in this regard. The communication devices 150 may be operable to communicate with the database server 135 and/or the application server 180 via the communication system 100. For example, one or more of the communication devices 150 may be operable to communicate with the database server 135 and/or the application server 180 via the cellular base station 120, the mobile core network 125 and the data network 130. Moreover, one or more of the communication devices 150 may be operable to communicate with the database server 135 and/or the application server 180 via the wireless access point and the data network 130. Similarly, the communication devices 150 may be operable to communicate via the communication system 100 with the location server 140.

The communication devices 150 may be operable to determine location and/or time based on one or more of a variety of methods. For example, the communication devices may be operable to determine location and/or time autonomously, with assistance data from a network device and/or may receive their location and/or a time from a network device within the communication system 100 and/or user input. In this regard, one or more of the plurality of communication devices 150 may comprise a GNSS receiver and may be operable to determine location utilizing a GNSS satellite system data, for example, from the GNSS satellites 162, 164 and/or 166. The communication devices 150 may be operable to utilize GNSS satellite data to determine location autonomously and/or with assistance from various network elements, for example, the location server 140 and/or the satellite reference network (SRN) 170. In various embodiments of the invention, other network elements, for example, the wireless access point 110 and/or the DSL modem 115, may be operable to provide location and/or time information to one or more of the communication devices 150 based on their location.

The communication devices 150 may comprise the mobile devices 152, 154 and/or 156. One or more of the communication devices 150, for example, the mobile device 152 may comprise suitable logic, circuitry, interfaces and/or code that are operable to receive satellite broadcast signals from one or more GNSS satellites that may be in view, for example, the GNSS satellites 162, 164 and/or 166. The mobile device 152 may take various GNSS measurements such as pseudorange and/or carrier phase on the received GNSS signals to calculate navigation information such as, for example, GNSS position of the mobile device 152. In some instances, the mobile device 152 may receive GNSS assistance information that may enable the mobile device 152 to determine its location.

In various exemplary embodiments of the invention, one or more of the communication devices 150 may be utilized to access and/or execute an application and/or a service. The application and/or service may be stored on one or more of the communication devices 150 or may be stored on a device in the communication system 150, for example, in the data network 130. The application server 180 may be operable to interact with one or more devices in the communication system 100 via the data network 130 and may process requests for services, for example, that may be received via the data network 130. In this regard, the application server 180 may comprise an application that the communication devices 150 may interact with. When the application is accessed via the data network 130, the application may be referred to as an on-line application. For example, the application may be utilized when one or more of the communication devices 150 accesses a website or a service via the data network 130.

In instances when one or more of the communication device 150, for example, the mobile device 152 executes a locally stored application and/or accesses an on-line application, the mobile device 152 may determine its location and/or a time associated with the execution and/or the access of the application. The mobile device 152 may communicate information about the application, the location of the mobile device 152 and/or the time that the application that was accessed and/or executed, to a server, for example, to the database server 135 or to the location server 140. This information may be referred to as the location, time and/or application information. In various exemplary embodiments of the invention, the location, time and/or application information may be communicated to, for example, a service provider, an organization, a business or an individual. The location, time and/or application information may be utilized for a variety of purposes, for example, for targeted advertising, for targeted communications and/or for providing services to, for example, device users or to the general public. In this regard, the recipients of the targeted information may be located at a particular place and/or at a particular time. In addition, for example, the location, time and/or application information may be utilized to determine demographic information about people in a specified area and/or at a specified time. Other activity and/or events that occur in the communication devices 150 may be monitored, time and/or location stamped and reported to the database server 135 and/or the location server 140. For example, phone calls made and/or interaction with users and/or other elements within the communication network 100, for example, with the mobile core network 130 may be reported.

The database server 135 may comprise suitable logic, circuitry, interfaces and/or code that may be operable to send and/or receive data via the data network 130. For example, the database server 135 may comprise a network device that is attached to the Internet or a private network. In addition, the database server 135 may comprise the database 132 that may be utilized to store the location, the time and/or the application information received from one or more of the communication devices 150. In this regard, the information stored in the database 132 may comprise information about various activities and/or applications executed on the mobile devices 150 and/or about various on-line applications accessed by the mobile devices 150. For example, the application information may comprise information about websites, content and/or services accessed by the mobile devices 152, 154 and/or 156. In addition, a location and/or the time corresponding to when an application is accessed and/or executed by one or more of the mobile devices 152, 154 and/or 156 may be stored in the database. In an exemplary embodiment of the invention, the database server 135 and/or the location server 140 may receive the location, time and/or application information from one or more of the communication devices 150 via the cellular base station 120, the mobile core network 125 and/or via the data network 130. Alternatively, the database server 135 and/or the location server 140 may receive the location, time and/or application information from one or more of the communication devices 150 via the wireless access point 110, the DSL modem 115 and the data network 130.

The GNSS satellites 162, 164 and/or 166 may comprise suitable logic, circuitry, interfaces and/or code that may be operable to generate and broadcast satellite navigational information. The broadcast satellite navigational information may be retrieved and utilized by one or more of the mobile devices 152, 154 and/or 156 to calculate their location and/or to determine time. Moreover, the GNSS satellites 162, 164 and/or 166 may comprise suitable logic, circuitry, interfaces and/or code that may be operable to generate and broadcast satellite navigational information for the SRN 170. The broadcast satellite navigational information may be collected by the SRN 170 to be utilized by the location server 140 and/or the mobile devices 152, 154 and/or 156 to enhance location based services (LBS) performance and/or assist in location determination. The GNSS satellites 162, 164 and/or 166 may comprise GPS, Galileo, and/or GLONASS satellites.

The SRN 170 may comprise suitable logic, circuitry, interfaces and/or code that are operable to acquire, collect and/or distribute data from GNSS satellites on a continuous basis. The SRN 170 may comprise a plurality of GNSS reference tracking stations located around the world to provide assisted GNSS coverage. The SRN 170 may be communicatively coupled with the location server 140, the data network 130 and/or the mobile core network 125, for example.

The location server 140 may comprise suitable logic, circuitry, interfaces and/or code that are operable to access the satellite reference network (SRN) 170 and may collect GNSS satellite data. The location server 140 may track GNSS constellations through the SRN 170. The location server 170 may be operable to utilize the collected GNSS satellite data to generate GNSS assistance data comprising, for example, ephemeris data, long term orbit (LTO) data, reference positions and/or time information for assisting in location determination by mobile devices and/or network devices. The location server 140 may provide the GNSS assistance data to one or more of the mobile devices 152, 154 and 156 via the mobile core network 120 and the cellular base station 120. Alternatively, the location server 140 may provide the GNSS assistance data to one or more of the mobile devices 152, 154 and 156 via the DSL modem 115 and the wireless access point 110 for location determination assistance.

In various exemplary embodiments of the invention, the location server 140 may comprise a database 142 that may be utilized to store the location, time and/or application information from one or more of the communication devices 150. Similar with respect to the database 132 in the database server 135, information stored within the database 142 may comprise information about various applications executed on the mobile devices 152, 154 and/or 156 and/or about various on-line applications accessed by the mobile devices. In an exemplary embodiment of the invention, the location server 140 may receive the location, time and/or application information from one or more of the communication devices 150 via the cellular base station 120, the mobile core network 125 and/or via the data network 130. Alternatively, the location server 140 may receive the location, time and/or application information from one or more of the communication devices 150 via the wireless access point 110, the DSL modem 115 and the data network 130.

The mobile core network 125 may comprise suitable logic, circuitry, interfaces and/or code that may be operable to provide an interface for one or more wireless access networks such as, a CDMA network, a GSM network, a UMTS network, and/or a WiMAX network and an external network, such as a packet data network (PDN), for example, the Internet or a private network. For example, the mobile core network 125 may provide an interface for the cellular base station 120 and the data network 130. The mobile core network 125 may be operable to handle various voice and/or data services. The mobile core network 125 may be operable to provide access to the data network 130, the location server 140, the SRN 170 and/or the database 135 to users of the mobile core network 125, such as, users of the mobile devices 152, 154 and/or 156. In various embodiments of the invention, the mobile core network 125 may handle location, time and/or application information from the communication devices 150 and may forward the information to the database server 135 and/or the location server 140, for example. Alternatively, the mobile core network 125 may comprise a database such as the data base 132 and may store the location, time and/or application information from the communication devices 150. For example, a service provider corresponding to the mobile core network 125 may manage, utilize and/or distribute the location, time and/or application information.

A cellular base station such as the cellular base station 120 may comprise suitable logic, circuitry, interfaces and/or code that are operable to manage and schedule communication resources in an uplink direction and/or downlink direction to various mobile devices such as the mobile devices 152, 154 and/or 156. The cellular base station 120 may be operable to communicate via radio frequency signals with the mobile devices 152, 154 and/or 156 using air interface protocols that may be specified for CDMA, GSM, UMTS, and/or LTE radio access, for example. The cellular base station 120 may be operable to communicate the location, time and/or application information from the mobile devices 152, 154 and/or 156, via the mobile core network 125, to one or more of the database server 135, the data network 130, the location server 140. Furthermore, the cellular base station 120 and/or the mobile core network 125 may be operable to determine location and/or time information for the communication devices 150 that corresponds to the application information and/or may communicate the information to one or more of the database server 135 and/or the location server 140, for example.

The wireless access point 110 may comprise suitable logic, circuitry, interfaces and/or code that are operable to provide wireless access for one or more of the communication devices 150 to a wireless or wired network using Wi-Fi, Bluetooth or related standards or other local area or short range networking technologies. The wireless access point 110 may comprise suitable logic, circuitry, interfaces and/or code that may be operable to handle communication between one or more of the communication devices 150 and one or more of the data network 130, the database server 135 and/or the location server 140, for example, via the DSL modem 115. In this regard, the location, time and/or application information corresponding to one or more of the communication devices 150 may be communicated to the location server 140 and/or to the database server 135 via the wireless access point 110. In various embodiments of the invention, the wireless access point may be operable to self locate and may provide location information for one or more of the communication devices 150 based on one or more of its own location, the location of the DSL modem 115 and/or of another device that may be located near the access point 110. U.S. patent application Ser. No. 12/748,177, filed on Mar. 26, 2010 which is incorporated herein in its entirety provides additional information regarding self-locating a wireless access point.

The data network 130 may comprise suitable devices, circuitry, interfaces and/or code that are operable to support data communication between one or more of the mobile devices 150 and one or more of the application server 180, the database server 135 and the location server 140. The data network 130 may comprise a single network and/or one or more interconnected networks. For example, the data network 130 may comprise a private network or may comprise the Internet. In various embodiments of the invention, the data network 130 may support communication based on the Internet Protocol Suite of standards.

In operation, one or more of the communication devices 150, for example, the mobile device 152 may be utilized to execute and/or access an application. The application may be stored within the mobile device 152 and/or may be stored in another device that may be accessible via the communication system 100. For example, the mobile device 152 may access an on-line application, a website and/or service in the application server 180 via the data network 130. Various content may be retrieved from the application server, for example, a train schedule, a shopping location guide and/or a web based video game. The mobile device 152 may internally store various information, for example, various information about executed or accessed applications, content that may be retrieved from a website, a service that may be utilized, a URL and/or a website accessed. The various information may be referred to as application information. For example, the mobile device 152 may monitor and/or store application information regarding content accessed and/or data processed by an application, a service and/or the website. In addition, the mobile device 152 may determine and store its location and/or a corresponding time, comprising from where and/or when the application is executed and/or accessed, the service is utilized, the website is accessed and/or the application information is stored. The mobile device 152 may access the cellular base station 120 and/or may access the wireless access point 110 and may communicate the determined location, time and/or the application information to one or both of the database server 135 and the location based server 140, for example. The location, time and/or application information may be stored in the database 132 and/or the data base 142, for example. The database server 135 and/or the location server 140 may store, analyze and/or forward the location, time and/or application information to another device. For example, the database server 135 may communicate the location, time and application information to a service provider or another entity such as public or private organization. The location, time and/or application information may be utilized for a variety of purposes, for example, for targeted advertizing, for communication and/or for providing services to device users and/or to the general public at specified location and/or at a specified time. In addition, for example, the location, time and/or application information may be utilized to determine demographic information about people in a specified area and/or at a specified time.

Figure 2:
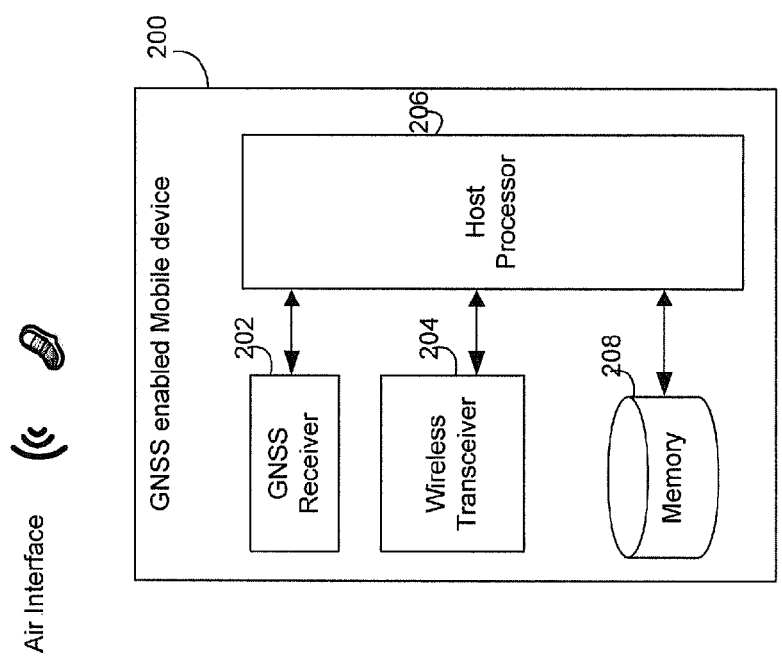
FIG. 2 is a block diagram illustrating an exemplary mobile device that is operable to provide to a server, location, time and/or application information, in accordance with an embodiment of the invention.

FIG. 2 is a block diagram illustrating an exemplary mobile device that is operable to provide to a server, location, time and/or application information, in accordance with an embodiment of the invention. Referring to FIG. 2, there is shown a mobile device 200. The mobile device 200 may comprise a GNSS receiver 202, a cellular transceiver 204, a host processor 206 and a memory 208.

The mobile device 200 may be similar and/or substantially the same as one or more of the communication devices 150, for example, the mobile device 200 may be similar and/or substantially the same as one or more of the mobile devices 152, 154 and 156. The location, time and/or application information is described with respect to FIG. 1. For example, the application information may comprise information regarding activity performed and/or content consumed on the mobile device 200 and/or regarding activity performed and/or data processed on-line or in a network device, based on communication from the mobile device 200.

The GNSS receiver 202 may comprise suitable logic, circuitry, interfaces and/or code that may be operable to detect and receive GNSS signals from a plurality of visible GNSS satellites such as the GNSS satellites 162, 164 and/or 166. The GNSS receiver 202 may be operable to utilize the received GNSS signals to calculate location information such as a GNSS position of the GNSS receiver 202 and/or determine a time, for example. In various embodiments of the invention, the GNSS receiver may utilize information from the location based server 140 for assisted and/or enhanced GNSS based location determination. The location and/or time information may be provided to the host processor 206 and/or may be stored in the memory 208.

The wireless transceiver 204 may comprise suitable logic, circuitry, interfaces and/or code that may be operable to communicate based on one or more radio access protocols, for example, CDMA, GSM, UMTS, LTE, WiMAX, WiFi, Bluetooth and/or Zigbee, although the invention is not limited in this regard. For example, the wireless transceiver 204 may be operable to communicate with the cellular base station 120 and/or the wireless access point 110. In various embodiments of the invention, the mobile device 200 may comprise a plurality of such wireless transceivers.

The host processor 206 may comprise suitable logic, circuitry, interfaces and/or code that may be operable to manage and/or control operations of mobile device 200 components such as the GNSS receiver 202 and/or the cellular transceiver 204. In addition, the host processor 206 may be operable to activate or deactivate one or more associated radios such as the GNSS receiver 202 and/or the wireless transceiver 204 as needed for communicating information. In various embodiments of the invention, the host processor 206 may be operable to manage execution of applications that may be stored in the memory 208. In addition, the host processor 206 may be operable to manage access to one or more applications, websites and/or services via the mobile core network 125 and/or via the data network 130. The host processor 206 may be operable to store information regarding interactions and/or data processed by the applications, websites and/or services that are accessed in the memory 208. In addition, the host processor may be operable to store a location of the communication device 200 and a time stamp when the device executes and/or accesses an application, a website and/or a service. In this regard, the location may be determined by the GNSS receiver and/or by another device in the communication system 100. The host processor 206 may be operable to communication the location, time and/or application information to the database server 135 and/or to the location server 140.

The memory 208 may comprise suitable logic, circuitry, interfaces and/or code that may be operable to store information such as executable instructions and data that may be utilized by the host processor 206 and/or other device components such as, for example, the GNSS receiver 202 and the cellular transceiver 204. The memory 208 may comprise storage on the mobile device 200 for the location, time and/or application information. The memory 208 may comprise RAM, ROM, low latency nonvolatile memory such as flash memory and/or other suitable electronic data storage.

In operation, the mobile device 200 which may be positioned at a certain location and time, may execute an application and/or access a website. The host processor 206 may request that the time and/or the location of the device 200 may be determined and/or may be stored in the memory 208. The host processor 206 may monitor activity on the mobile device 200. For example, the host processor 206 may monitor which application, website and/or service may be accessed. The host processor 206 may monitor content that is accessed and/or data that is processed by the application, website and/or service. The host processor 206 may store information about the monitored activity in the memory 208. Furthermore, the host processor 206 may communicate the information about the monitored activity, for example, the location, time and/or application information, to the database server 135 and/or to the location server 140. In this regard, the information about the monitored activity may be transmitted by the wireless transceiver 204 to the cellular base station 120 or to the wireless access point 110 depending on the protocol supported by the transceiver 204.

In an exemplary operation, the host processor 206 may be operable to manage and/or to control operations of, for example, the GNSS receiver 202 and/or the cellular transceiver 204, depending on corresponding needs. For example, the host processor 206 may be operable to coordinate the operations of the GNSS receiver 202 and the cellular transceiver 204 to simultaneously receive GNSS signals from GNSS satellites and communicate with the cellular base station 120 and/or the wireless access point 110.

Figure 3:
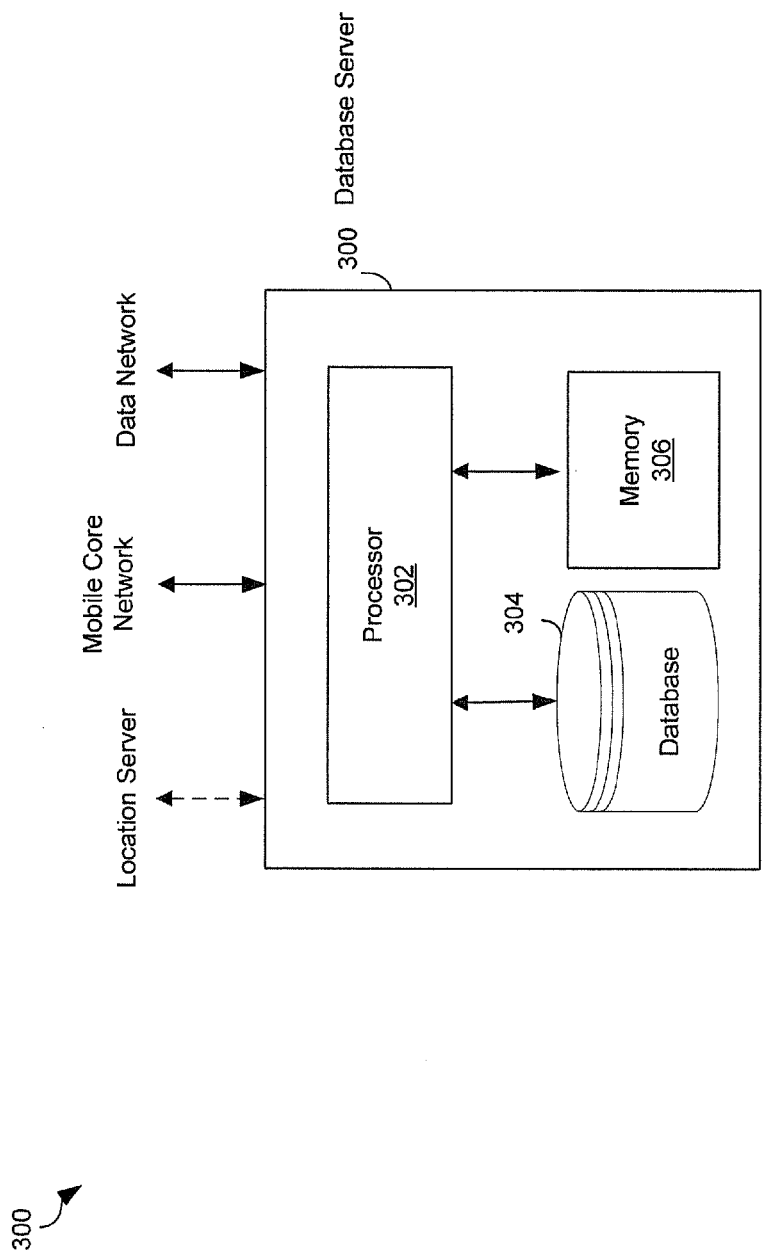
FIG. 3 is a block diagram illustrating an exemplary database server that is operable to store location, time and/or application information, in accordance with an embodiment of the invention.

FIG. 3 is a block diagram illustrating an exemplary database server that is operable to store location, time and/or application information, in accordance with an embodiment of the invention. Referring to FIG. 3, there is shown, a database server 300, a processor 302, a database 304 and a memory 306.

The database server 306 may be similar and/or substantially the same as the database server 135 and/or the location server 140 that are described with respect to FIG. 1 and FIG. 2. The database 304 may be similar and/or substantially the same as the database 132 and/or the database 142 described with respect to FIG. 1 and FIG. 2. Furthermore, the location, time and/or application information is described with respect to FIG. 1 and FIG. 2

The memory 306 may comprise suitable logic, circuitry, interfaces and/or code that may be operable to store information such as executable instructions and data that may be utilized by the processor 302 and/or other units such as the database 304. The memory 306 may comprise RAM, ROM, low latency nonvolatile memory such as flash memory and/or other suitable electronic data storage.

The processor 302 may comprise suitable logic, circuitry, interfaces and/or code that may be operable to manage and/or control operations of the database 304 and the memory 306. The processor 302 may be operable to collect location, time and/or application information that may be received from the communication devices 150 and may store the information within the memory 306. The processor 302 may utilize the collected location, time and/or application information to build the database 304. In various embodiments of the invention, the information in the database 304 may be configured in such a manner as to enable analysis and/or manipulation of the location, time and/or application information. The information in the database 304 may be accessible for communication to various devices, for example, devices in the communication system 200.

In operation, the database server 300 may comprise a device that is communicatively coupled with a network, for example, the data network 130 and/or the mobile core network 125. The database server may be operated by any suitable entity, such as a service provider, an LBS service, a business, a government or public organization and/or an individual, for example. The database server 300 may be operable to collect and/or organize location, time and/or application information from one or more devices in the plurality of communication devices 150, for example, the mobile devices 152, 154 and/or 156. The database server 300 may build a database 304 comprising the location, time and/or application information. In various embodiments of the invention, the database server 300 may receive the location, time and/or application information regarding activity initiated and/or performed by one or more of the communication devices 150 from another device within the communication system 100, for example, from the mobile core network 125. In this regard, the mobile core network 125 may be operable to monitor activity initiated and/or performed by one or more of the communication devices 150 and/or may determine a location of the devices and/or a time at which the activity occurred. The mobile core network 125 may be operable to communicate the location, time and/or application information to the database server 300. The location, time and/or application information may be communicated to another device for processing and/or analysis or it may be processed and/or analyzed by the database server 300 in the processor 302.

In various embodiments of the invention, the location time and/or application information may be manipulated, analyzed and/or associated with other information. For example, the application information may be geographically mapped or mapped over time. Needs, interests and/or various demographic information regarding people at a particular location and/or time may be determined based on the location, time and/or application information. The location, time and/or application information may be utilized to determine actions that may be taken, for example, by a business with regard to a specified location and/or time. For example, a service provider may see an excessive amount of data traffic for on-line gaming applications in a particular area and may modify radio access resources in the area to accommodate the demand. Alternatively, a business may utilize the location, time and/or application information to determine where and/or when to place targeted advertising. The advertising may be broadcast to communication devices in a particular geographic area in accordance with the interests and/or needs of users in the area as indicated by the location, time and/or application information. Alternatively, advertizing in other forms of media, for example, signs, billboards and/or video streams on a public display may be placed in a geographic location in accordance with the interests and/or needs of users in the area as indicated by the location, time and/or application information. The invention is not limited with regard to any specific utility or usage of the location, time and/or application information and may comprise any suitable usage of the information. For example, government, safety services, schools and/or medical providers may utilize the location, time and/or application information.

Figure 4:
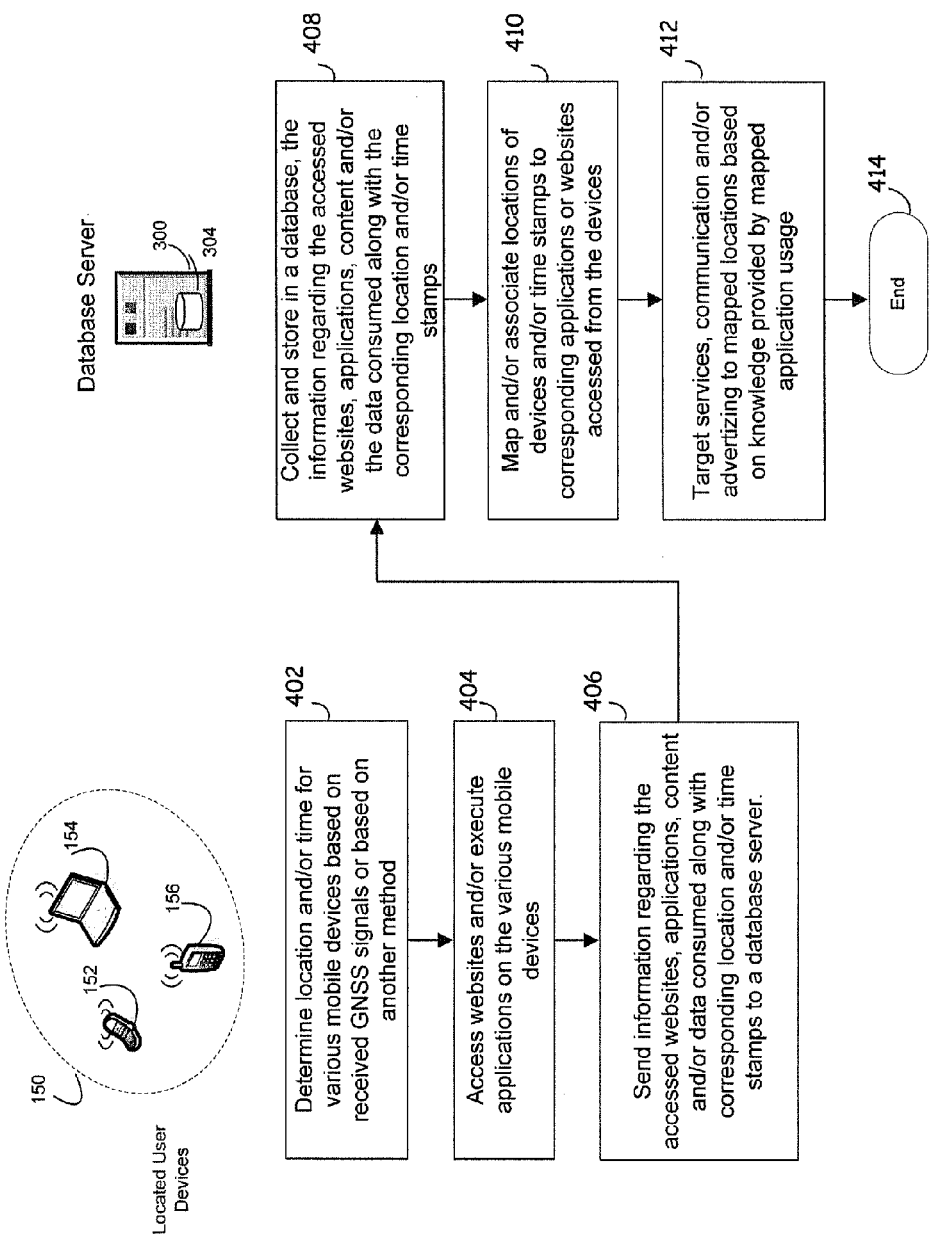
FIG. 4 is a flow chart illustrating exemplary steps for reporting location, time and/or corresponding device activity to a database server for determining targeted services or targeted advertising, in accordance with an embodiment of the invention.

FIG. 4 is a flow chart illustrating exemplary steps for reporting location, time and/or corresponding device activity to a database server for determining targeted services or targeted advertising, in accordance with an embodiment of the invention. Referring to FIG. 4, in exemplary step 402, location and/or time for various mobile devices, for example, one or more of the mobile devices 152, 154 and 156, may be determined. Various methods may be utilized to determine the location and/or time, for example, GNSS signals and/or assistance data may be utilized for self location by the mobile devices 152, 154 and/or 156 and/or other methods such as network based location determination. In step 404, the various mobile devices 152, 154 and/or 156, may access websites and/or may execute local or on-line applications. In step 406, information regarding the applications, websites, content accessed and/or data consumed, for example, may be sent to a database server, for example, the database server 300, along with corresponding location and/or time stamps. In step 408, the information regarding applications, websites, content and/or data consumed may be collected and/or stored in a database along with the corresponding location and/or time stamps, for example, the database 304 may be utilized. In step 410, locations of the mobile devices and/or the times stamps may be mapped to corresponding application or website information. In step 412, services, communication and/or advertizing may be targeted to the mapped locations and/or times based on knowledge provided by mapped application usage. The exemplary steps may end at step 414.

In an embodiment of the invention, one or more processors and/or circuits in a mobile device, for example, the mobile device 200 may be operable to collect information about an application, information about accessing of the application and/or information about interaction with the application by the mobile device 200. The information about the application, the accessing of the application and/or the interaction with the application by the mobile device may be referred to as the application information. The collected information may comprise one or more of a URL that is utilized to access a device, such as the application server 180 and/or a website, information about any local or remote application that executes subsequent to and/or as a result of utilizing the URL, and content retrieved from the accessed device, for example. The application may be stored and/or executed on the mobile device 200 or may be stored and/or executed on a device that is external to the mobile device 200, for example, the application server 180. The collected application may be accessed via one or more of a data network, for example, the data network 130, a voice network and/or a mobile device network, for example, the mobile core network 120.

A location of the mobile device 200 and/or a time may be associated with the collected application information. The location of the mobile device 200 and/or the time may be determined utilizing a GNSS receiver, for example, the GNSS receiver 202 within the mobile device 200 and/or may be determined utilizing information from a network device, for example, the location server 140 and/or the mobile core network 120. The collected application information, the associated location of the mobile device 200 and/or the associated time may be communicated to an external device, for example, the database server 300.

The application information may comprise one or more of identification of a website, identification of a network device, identification of the application and data that is input and/or output from the application. The collected application information, the location of the mobile phone 200 and/or the time may be stored by an external device comprising storage, for example, in the database 132 within the database server 135 and may be utilized to determine targeted advertising. The external device may be operated and/or managed by a service provider for the mobile device 200 and/or may be operated by another entity.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining application usage relative to a particular location.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication performed by one or more processors and/or circuits in a mobile device, the method comprising:
    collecting information about one or more of an application, accessing of said application, and interaction with said application, wherein said interaction is by said mobile device;
    associating a location of said mobile device with said collected information;
    associating a time with said collected information;
    communicating said collected information, said associated location of said mobile device and said associated time to a device that is external to said mobile device; and
    receiving targeted information from said external device, said targeted information being determined based on said collected information, said associated location of said mobile device and said associated time.

2. The method according to claim 1, comprising storing and/or executing said application on one or both of said mobile device and a server device.

3. The method according to claim 1, wherein said collected information comprises one or more of:
    a uniform resource locator (URL) that is utilized to access a device and/or a website;
    information about any local or remote application that executes subsequent to and/or as a result of utilizing said URL; and
    content retrieved from said accessed device.

4. The method according to claim 1, comprising accessing said application via one or more of a data network, a voice network and a mobile device network.

5. The method according to claim 1, comprising determining one or both of said location of said mobile device and said time utilizing a Global Navigation Satellite-based System (GNSS) receiver within said mobile device.

6. The method according to claim 1, comprising determining one or both of said location of said mobile device and said time utilizing information from a network device.

7. The method according to claim 1, wherein said collected information comprises one or more of identification of a website, identification of a network device, identification of said application and data that is input and output from said application.

8. The method according to claim 1, wherein said external device stores in a storage device, one or more of said information about said application, said accessing of said application, said interaction with said application, said location and said time.

9. The method according to claim 1, wherein said targeted information comprises targeted advertising.

10. The method according to claim 1, wherein said external device is operated and/or managed by a service provider for said mobile device.

11. A mobile device comprising:
    a Global Navigation Satellite-based System (GNSS) receiver configured to determine a location of said mobile device and a time;
    a processor configured to:
        collect information about one or more of an application, accessing of said application, and interaction with said application by said mobile device;
        associate said location of said mobile device with said collected information; and
        associate said time with said collected information; and
    a transceiver configured to communicate said collected information, said associated location of said mobile device, and said associated time to a device that is external to said mobile device, said transceiver further configured to receive targeted information from said external device, said targeted information being determined based on said collected information, said associated location of said mobile device and said associated time.

12. The system according to claim 11, wherein said processor is configured to store and/or execute said application on one or both of said mobile device and a server device.

13. The system according to claim 11, wherein said collected information comprises one or more of:
   a uniform resource locator (URL) that is utilized to access a device and/or a website;
   information about any local or remote application that executes subsequent to and/or as a result of utilizing said URL; and
   content retrieved from said accessed device.

14. The system according to claim 11, wherein said processor is configured to access said application via one or more of a data network, a voice network and a mobile device network.

15. The system according to claim 11, wherein:
   said transceiver is further configured to receive location information from a network device; and
   said processor is further configured to determine one or both of said location and said time utilizing one or both of said GNSS receiver and said location information from said network device.

16. The system according to claim 11, wherein said collected information comprises one or more of identification of a website, identification of a network device, identification of said application and data that is input and output from said application.

17. The system according to claim 11, wherein said external device stores in a storage device one or more of said information about said application, said accessing of said application, said interaction with said application, said location, and said time.

18. The system according to claim 11, wherein said targeted information comprises targeted advertising.

19. The system according to claim 11, wherein said external device is operated and/or managed by a service provider for said mobile device.

20. A method for communication in a mobile communication device, the method comprising:
   determining a location of said mobile communication device and a time when said mobile communication device executes local and/or on-line applications, accesses a web-site and/or consumes content;
   stamping information corresponding to said local and/or on-line applications, said web-site and/or said content with said location and said time of said mobile communication device;
   sending said stamped information to a database server; and
   receiving targeted services from said database server, said targeted services being based on said stamped information, said stamped information being further utilized to provide targeted services to device users and/or to a general public located at a specified location and/or at a specified time.

* * * * *